United States Patent
Kawamoto et al.

(10) Patent No.: US 12,036,629 B2
(45) Date of Patent: Jul. 16, 2024

(54) ARC WELDING METHOD AND ARC WELDING DEVICE

(71) Applicant: Panasonic Intellectual Property Management Co., Ltd., Osaka (JP)

(72) Inventors: Atsuhiro Kawamoto, Hyogo (JP); Kaito Matsui, Osaka (JP); Masaru Kowa, Osaka (JP); Takahiro Noguchi, Osaka (JP); Masashi Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 960 days.

(21) Appl. No.: 17/019,623

(22) Filed: Sep. 14, 2020

(65) Prior Publication Data

US 2020/0406385 A1 Dec. 31, 2020

Related U.S. Application Data

(63) Continuation of application No. 15/743,433, filed as application No. PCT/JP2016/003872 on Aug. 25, 2016, now Pat. No. 10,807,180.

(30) Foreign Application Priority Data

Sep. 3, 2015 (JP) ................................ 2015-173366

(51) Int. Cl.
*B23K 9/073* (2006.01)
*B23K 9/09* (2006.01)
(Continued)

(52) U.S. Cl.
CPC ............ *B23K 9/073* (2013.01); *B23K 9/0732* (2013.01); *B23K 9/09* (2013.01); *B23K 9/095* (2013.01);
(Continued)

(58) Field of Classification Search
CPC ........ B23K 9/073; B23K 9/0732; B23K 9/09; B23K 9/095; B23K 9/124; B23K 9/173; B23K 2103/10; B23K 2103/04
See application file for complete search history.

(56) References Cited

U.S. PATENT DOCUMENTS

| | | |
|---|---|---|
| 5,317,116 A | 5/1994 | Tabata |
| 6,051,810 A | 4/2000 | Stava |
| (Continued) | | |

FOREIGN PATENT DOCUMENTS

| | | | | |
|---|---|---|---|---|
| CN | 102009245 | | 4/2011 | |
| CN | 104368900 A | * | 2/2015 | ............. B23K 9/167 |
| (Continued) | | | | |

OTHER PUBLICATIONS

English Translation of Chinese Search Report dated Nov. 27, 2020 for related Chinese Patent Application No. 201910857325.4.
(Continued)

*Primary Examiner* — Nathaniel E Wiehe
*Assistant Examiner* — Dilnessa B Belay
(74) *Attorney, Agent, or Firm* — Wenderoth, Lind & Ponack, L.L.P.

(57) ABSTRACT

A base material is welded by a first welding method in a case where a welding parameter related to heat input to the base material is less than a first threshold value. The base material is welded by a second welding method in a case where the welding parameter is less than a second threshold value and is more than the first threshold value. The base material is welded by a third welding method in a case where the welding parameter is more than the second threshold value. By adjusting welding conditions regardless of the thickness of the base material, a welding method suitable for the
(Continued)

thickness of the base material is determined to provide a welding with little spatter and no meltdown of the base material.

8 Claims, 7 Drawing Sheets

(51) Int. Cl.
  *B23K 9/095*   (2006.01)
  *B23K 9/12*    (2006.01)
  *B23K 9/173*   (2006.01)
  *B23K 103/04*  (2006.01)
  *B23K 103/10*  (2006.01)

(52) U.S. Cl.
  CPC .............. *B23K 9/124* (2013.01); *B23K 9/173* (2013.01); *B23K 2103/04* (2018.08); *B23K 2103/10* (2018.08)

(56) References Cited

U.S. PATENT DOCUMENTS

| | | | |
|---|---|---|---|
| 6,331,694 | B1 | 12/2001 | Blankenship |
| 7,304,269 | B2 | 12/2007 | Fulmer |
| 9,776,273 | B2 | 10/2017 | Fujiwara |
| 2006/0207983 | A1 | 9/2006 | Myers |
| 2007/0056944 | A1 | 3/2007 | Artelsmair |
| 2008/0083705 | A1 | 4/2008 | Peters |
| 2009/0152252 | A1 | 6/2009 | Kawamoto |
| 2010/0133250 | A1 | 6/2010 | Sardy |
| 2012/0097656 | A1 | 4/2012 | Peters |
| 2013/0161302 | A1 | 6/2013 | Aberg |
| 2014/0008342 | A1 | 1/2014 | Peters |
| 2014/0124492 | A1 | 5/2014 | Daniel et al. |
| 2014/0263242 | A1 | 9/2014 | Peters |
| 2015/0190877 | A1 | 7/2015 | Plottier et al. |
| 2016/0074954 | A1 | 3/2016 | Marschke |
| 2016/0136764 | A1 | 5/2016 | Enyedy |
| 2017/0225253 | A1 | 8/2017 | Matsuoka |
| 2018/0036824 | A1 | 2/2018 | Peters |
| 2020/0094356 | A1 | 3/2020 | Pfeifer |
| 2020/0101550 | A1 | 4/2020 | Murakami |
| 2020/0156172 | A1 | 5/2020 | Hsu |

FOREIGN PATENT DOCUMENTS

| | | | |
|---|---|---|---|
| JP | 60-255276 | 12/1985 | |
| JP | 7-009149 | 1/1995 | |
| JP | 2007-508939 | 4/2007 | |
| JP | 2011-235348 | 11/2011 | |
| JP | 2015-030017 | 2/2015 | |
| WO | WO-2013190746 A1 * | 12/2013 | ............. B23K 9/073 |

OTHER PUBLICATIONS

International Search Report of PCT application No. PCT/JP2016/003872 dated Oct. 18, 2016 with attached English language translation.

The Extended European Search Report dated Sep. 28, 2018 for the related European Patent Application No. 16841096.7.

* cited by examiner

| Welding Current I (A) | Welding Method | | Welding Results | |
|---|---|---|---|---|
| 150 | Short-Circuit Welding | G | Stable Arc, Little Spatter | |
| | Hybrid Welding | NG | Droplet Not Removed, Much Spatter | |
| | Pulse Welding | NG | Much Heat Input, Droplet Falls | |
| 180 | Short-Circuit Welding | G | Stable Arc, Little Spatter | |
| | Hybrid Welding | G | Stable Arc, Little Spatter | |
| | Pulse Welding | NG | Much Heat Input, Droplet Falls | A1 |
| 200 | Short-Circuit Welding | G | Stable Arc, Little Spatter | |
| | Hybrid Welding | G | Stable Arc, Little Spatter | |
| | Pulse Welding | NG | Much Heat Input, Droplet Falls | |
| 220 | Short-Circuit Welding | NG | Much Spatter | |
| | Hybrid Welding | G | Stable Arc, Little Spatter | |
| | Pulse Welding | NG | Much Heat Input, Droplet Falls | |
| 250 | Short-Circuit Welding | NG | Much Spatter | |
| | Hybrid Welding | G | Stable Arc, Little Spatter | |
| | Pulse Welding | NG | Much Heat Input, Droplet Falls | |
| 270 | Short-Circuit Welding | NG | Much Spatter | |
| | Hybrid Welding | G | Stable Arc, Little Spatter | |
| | Pulse Welding | G | Stable Arc, Little Spatter | A2 |
| 290 | Short-Circuit Welding | NG | Much Spatter | |
| | Hybrid Welding | G | Stable Arc, Little Spatter | |
| | Pulse Welding | G | Stable Arc, Little Spatter | |
| 320 | Short-Circuit Welding | NG | Much Spatter | |
| | Hybrid Welding | NG | Not Short-Circuiting, Much Spatter | |
| | Pulse Welding | G | Stable Arc, Little Spatter | |

FIG. 7

| Welding Current I (A) | Welding Method | | Welding Results | |
|---|---|---|---|---|
| 60 | Short-Circuit Welding | G | Stable Arc, Little Spatter | |
| | Hybrid Welding | NG | Droplet Not Removed, Much Spatter | |
| | Pulse Welding | NG | Much Heat Input, Droplet Falls | |
| 80 | Short-Circuit Welding | G | Stable Arc, Little Spatter | |
| | Hybrid Welding | G | Stable Arc, Little Spatter | |
| | Pulse Welding | NG | Much Heat Input, Droplet Falls | A1 |
| 100 | Short-Circuit Welding | G | Stable Arc, Little Spatter | |
| | Hybrid Welding | G | Stable Arc, Little Spatter | |
| | Pulse Welding | NG | Much Heat Input, Droplet Falls | |
| 120 | Short-Circuit Welding | NG | Much Spatter | |
| | Hybrid Welding | G | Stable Arc, Little Spatter | |
| | Pulse Welding | NG | Much Heat Input, Droplet Falls | |
| 130 | Short-Circuit Welding | NG | Much Spatter | |
| | Hybrid Welding | G | Stable Arc, Little Spatter | |
| | Pulse Welding | NG | Much Heat Input, Droplet Falls | |
| 150 | Short-Circuit Welding | NG | Much Spatter | |
| | Hybrid Welding | G | Stable Arc, Little Spatter | |
| | Pulse Welding | G | Stable Arc, Little Spatter | A2 |
| 180 | Short-Circuit Welding | NG | Much Spatter | |
| | Hybrid Welding | G | Stable Arc, Little Spatter | |
| | Pulse Welding | G | Stable Arc, Little Spatter | |
| 200 | Short-Circuit Welding | NG | Much Spatter | |
| | Hybrid Welding | NG | Not Short-Circuiting, Much Spatter | |
| | Pulse Welding | G | Stable Arc, Little Spatter | |

ARC WELDING METHOD AND ARC WELDING DEVICE

This application is a U.S. national stage application of the PCT international application No. PCT/JP2016/003872 filed on Aug. 25, 2016, which claims the benefit of foreign priority of Japanese patent application No. 2015-173366 filed on Sep. 3, 2015, the contents all of which are incorporated herein by reference.

TECHNICAL FIELD

The present invention relates to an arc welding method and an arc welding device for performing arc welding while feeding a welding wire which is a consumable electrode.

BACKGROUND ART

In a welding industry in recent years, there is an increasing demand for high-quality welding and improvement in production efficiency so as to improve productivity. Especially, reduction of spatter and high-speed welding are important items in market demand. As the generation of the spatter is increased, spatter often adheres to a base material to be welded. If the spatter adheres to the base material, post-treatment for removing the adhering spatter is necessary and thus the welding productivity is lowered. In addition, if there is a case where a product in a state where the spatter adheres to the base material is flows out without performing the post-treatment, product value is significantly impaired.

PTL 1 discloses hybrid welding alternately repeating pulse welding and short-circuit welding. The hybrid welding has intermediate characteristics that heat input thereof is more than that of the short-circuit welding and is less than that of pulse welding.

Figure 1:
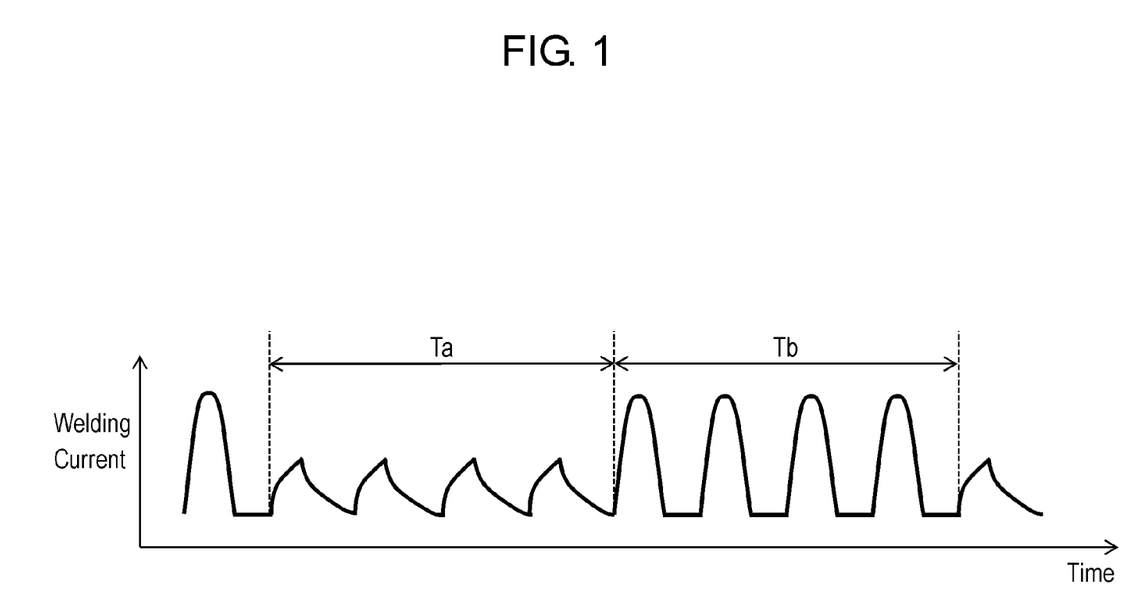
FIG. 1 illustrates a welding current of a conventional arc welding method.

FIG. 1 illustrates a welding current in the hybrid welding disclosed in PTL 1. In FIG. 1, the vertical axis represents the welding current and the horizontal axis represents time. In FIG. 1, the short-circuit welding is performed in a short-circuit transition duration Ta and the pulse welding is performed in a pulse transition duration Tb. In the short-circuit welding, a welding voltage which can stably perform the short-circuit welding at a set feed speed of the welding wire is previously set, and the number of short-circuits (one or more times) thereof is also previously set. On the other hand, in the pulse welding, the feed speed of the welding wire is previously set so that an average current of the welding current does not exceed a critical current. In addition, the number of one or more pulses is also previously set.

CITATION LIST

Patent Literature

PTL 1: Japanese Patent Laid-Open Publication No. 60-255276

SUMMARY

A base material is welded by a first welding method in a case where a welding parameter related to heat input to the base material is less than a first threshold value. The base material is welded by a second welding method in a case where the welding parameter is less than a second threshold value and more than the first threshold value. The base material is welded by a third welding method in a case where the welding parameter is more than the second threshold value.

By adjusting welding conditions regardless of the thickness of the base material, a welding method suitable for the thickness of the base material is determined to provide a welding with little spatter and no meltdown of the base material.

DETAIL DESCRIPTION OF EXEMPLARY EMBODIMENT

In a case where a short-circuit welding method and a pulse welding method are installed into a welding device, waveform control parameters are linked to values of a welding current from the minimum current to the maximum rated current of the welding device for each welding method or wire feeding amounts to set values of the welding current and a welding voltage, thereby allowing a base material to be easily welded.

The range of the welding current that exhibits low spatter performance changes according to each welding method.

In a case where base material 22 is made of soft steel-based material of iron-based metallic material, although the short-circuit welding method, for example, has little spatter if the welding current region is equal to 200 A, or less than 200 A, as the welding current is increased to excess 200 A, the spatter is increased. In particular, a region from 220 A to 300 A is a globule region and provides large grain spatter generated within the range, hence increasing an amount of spatter attached. Low spatter is generated if welding is performed in a low current region without using a current region in which a large amount of spatter is generated. But, this welding has a low welding speed. Therefore, in order to secure the same wire welding amount, production time increases and the productivity is decreased.

In the pulse welding method, if the region of the welding current of the base material having a plate thickness equal to 3.2 mm, or more than 3.2 mm is equal to about 270 A, or more than 270 A, for example, little spatter is generated, but meltdown is generated. The meltdown is phenomenon that for example, mainly molten metal of the base material melts down to a side opposite to a welding wire from the base material in a welding portion which is a portion of base material 22 to be welded during the welding since the pulse welding has high heat input as the welding current is less than about 200 A so as to weld a thin plate having a plate thickness of 2.3 mm or less. In addition, this low current region is preferably used since directivity of the arc is decreased, arc blowing is generated, the generation of arc breakage is increased, and thus the spatter is increased when the welding current is equal to 200 A, or less than 200 A.

Figure 2:
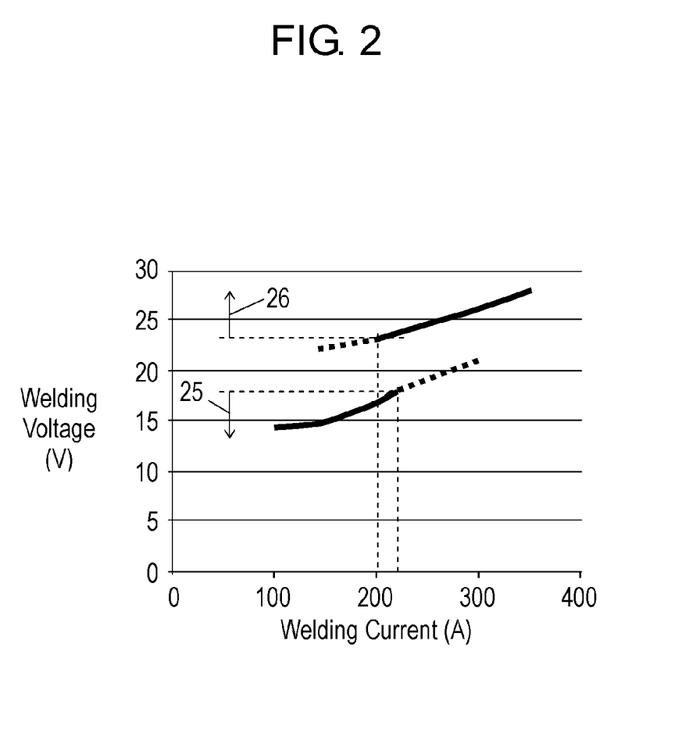
FIG. 2 illustrates a relationship between a welding current and a welding voltage in arc welding.

FIG. 2 illustrates range 25 of the welding voltage suitable to the welding current in the short-circuit welding and range 26 of the welding voltage suitable to the welding current in the pulse welding in a case where base material 22 is made of soft steel-based material of iron-based metallic material. In FIG. 2, the vertical axis represents the welding voltage and the horizontal axis represents the welding current. As illustrated in FIG. 2, for example, even with the same welding current of 200 A, the suitable welding voltage in the short-circuit welding ranges, for example, from 17 to 18 V, whereas the suitable welding voltage in the pulse welding is increased to the range, e.g. from 23 to 24 V. The heat input in the pulse welding thus is more than that of the short-circuit welding. Therefore, in a case where the pulse welding is performed using the same heat input as that in the short-circuit welding with a welding current of 200 A since the welding current in the pulse welding is too high for 200 A, the welding current for the pulse welding is reduced to about 150 A. However, it is difficult to use a welding current value of 150 A of the pulse welding since spatter is increased due to, e.g. the generation of the arc blowing.

In the hybrid welding alternately repeating the pulse welding and the short-circuit welding as disclosed in PTL 1, the spatter may increase due to meltdown and the generation of the arc blowing during pulse output since the heat input within the low current region is more than that in the short-circuit welding and since the welding speed cannot be increased and the productivity is lowered, particularly in the welding of a thick base material since the heat input within the high current region is less than that in the pulse welding. In the conventional welding device, a user first sets the welding method when the welding is performed. Welding conditions can be set by switching the welding method according to the plate thickness of the base material as long as a worker is skilled in the welding method. However, the set value of the welding current may be reduced to weld a thin base material while setting to the pulse welding and the set value of the welding current is increased to range from 200 A to 300 A to weld a thick base material while setting to the short-circuit welding without understanding the characteristics of the welding method by most workers. In addition, in a case where the thicknesses of portions of the base material are different from each other at a lot of welding positions, increase in spatter and falling of molten droplets is generated since it is troublesome to change settings such as the welding method at each welding location and thus the proper welding method is not set for the thickness.

Exemplary Embodiment

Figure 3:
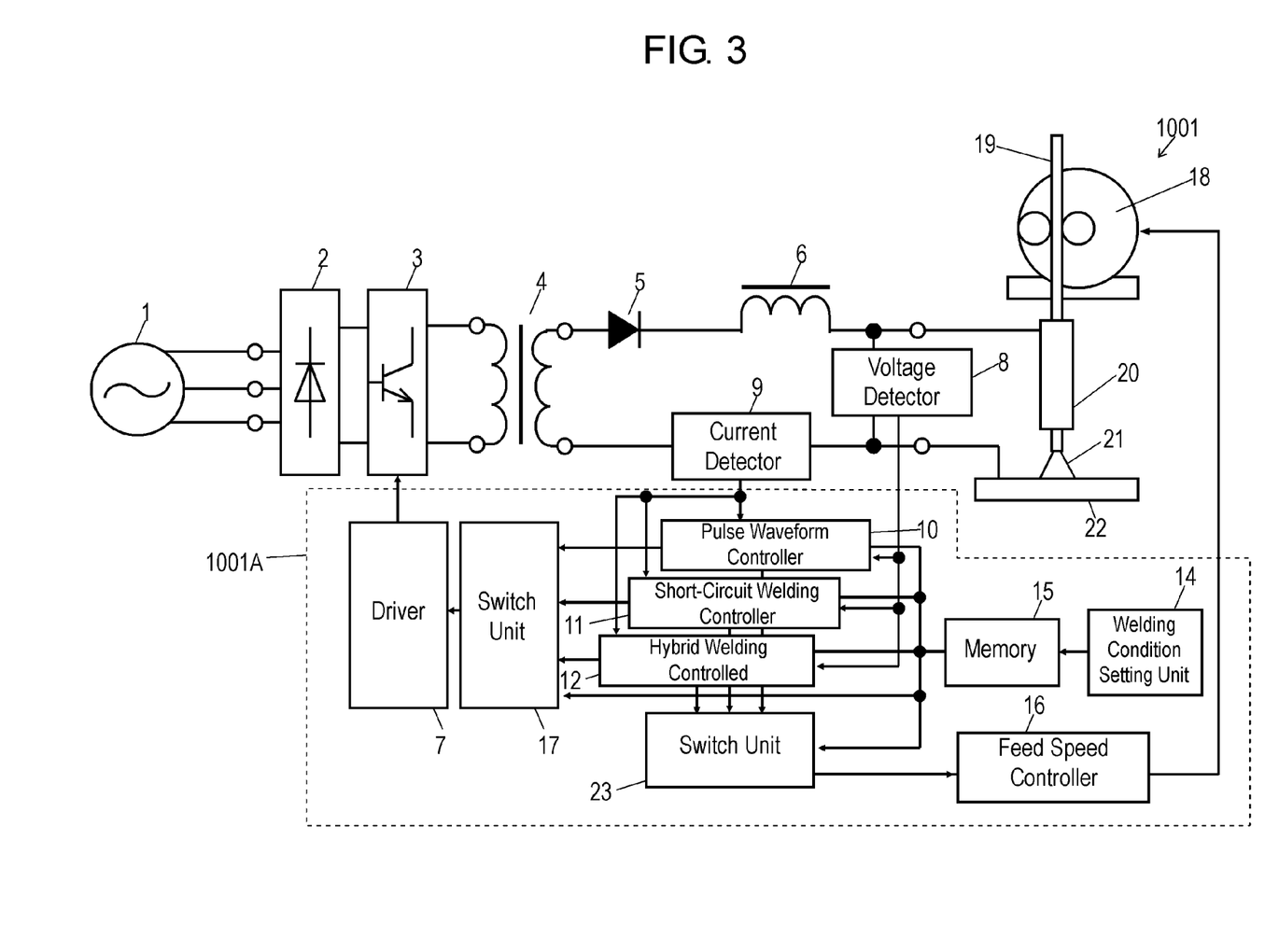
FIG. 3 is a schematic diagram of an arc welding device according to an exemplary embodiment.

FIG. 3 is a schematic diagram of arc welding device 1001 in accordance with an exemplary embodiment. Arc welding device 1001 is configured to weld base material 22 by at least one of short-circuit welding and pulse welding by generating arc 21 between welding wire 19 which is a consumable electrode and base material 22 which is an object to be welded. In other words, arc welding device 1001 is configured to weld base material 22 by the short-circuit welding, the pulse welding, and a hybrid welding alternately repeating the pulse welding and the short-circuit welding.

Arc welding device 1001 includes primary rectifier 2, switching block 3, main transformer 4, secondary rectifier 5, reactor (DCL) 6, driver 7, voltage detector 8, current detector 9, pulse waveform controller 10, short-circuit welding controller 11, hybrid welding controller 12, welding condition setting unit 14, memory 15, feed speed controller 16, switch units 17 and 23, feed motor 18, and chip 20.

Primary rectifier 2 rectifies an output of input power supply 1 and output the rectified output. Switching block 3 controls a welding output including the welding voltage and the welding current by converting the direct-current (DC) output from primary rectifier 2 into an alternating-current (AC) voltage. Main transformer 4 converts the AC voltage output from switching block 3. The output of main transformer 4 is output as a welding output via reactor 6 and secondary rectifier 5 which rectifies an output from a secondary side of main transformer 4. Voltage detector 8 detects welding voltage V. Current detector 9 detects welding current I. Welding condition setting unit 14 sets welding conditions including welding current I and welding voltage V. Memory 15 stores a threshold value and outputs a welding method previously stored and a proper control value and a feed speed of welding wire 19 corresponding to the output from welding condition setting unit 14. According to the output of memory 15, switch unit 17 outputs a signal for the welding output from one of short-circuit welding controller 11, pulse waveform controller 10, and hybrid welding controller 12. Feed speed controller 16 controls a feed speed of welding wire 19 according to a set current of the welding current which is set by welding condition setting unit 14. The feed speed correlates with the welding current correlate. Driver 7 controls switching block 3. Driver 7, pulse waveform controller 10, short-circuit welding controller 11, hybrid welding controller 12, welding condition setting unit 14, memory 15, feed speed controller 16, and switch units 17 and 23 constitute controller 1001A which controls switching block 3.

Based on the output of memory 15, switch unit 23 selects one of outputs of the feed speed of short-circuit welding controller 11 which controls the short-circuit welding, pulse waveform controller 10 which controls the pulse welding, and hybrid welding controller 12 which controls the hybrid welding. The threshold value stored by memory 15 is a threshold value of a welding parameter related to heat input to base material 22, and is welding current I, the feed speed or welding voltage V.

An arc welding control method using arc welding device 1001 according to the embodiment will be described below.

Figure 4:
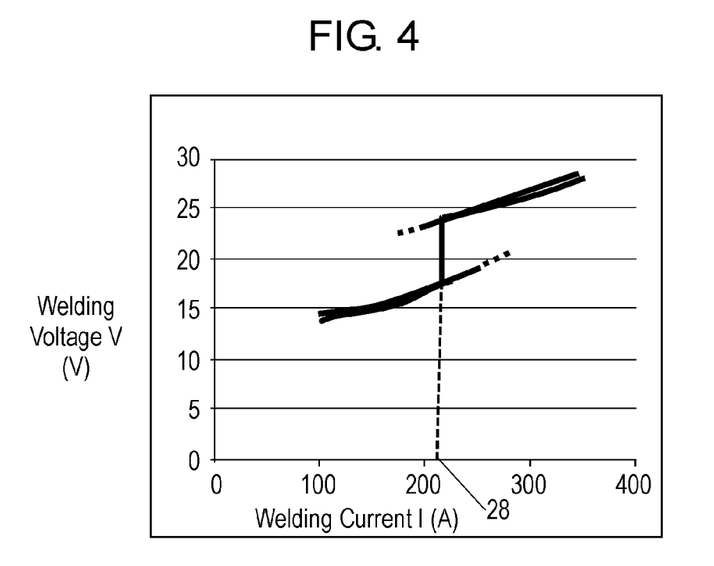
FIG. 4 illustrates a relationship between a welding current and a welding voltage in an arc welding method according to the embodiment.

FIG. 4 illustrates welding current I and welding voltage V in the arc welding method in accordance with the embodiment. In FIG. 4, the vertical axis represents welding voltage V, and the horizontal axis represents welding current I.

Memory 15 (see FIG. 3) stores threshold value 28. In a case where welding current I is equal to threshold value 28, or less than threshold value 28, since electric energy is low, switch unit 17 selects the output of short-circuit welding controller 11 suitable for thin base material 22 to perform the short-circuit welding. In a case where welding current I is more than threshold value 28, since the electric energy is high, switch unit 17 selects the output of pulse waveform controller 10 suitable for thick base material 22 to perform the pulse welding. As illustrated in FIG. 4, when welding current I is more than threshold value 28, switch unit 17 switches from the short-circuit welding to pulse welding to increase the heat input to base material 22.

Figure 5A:
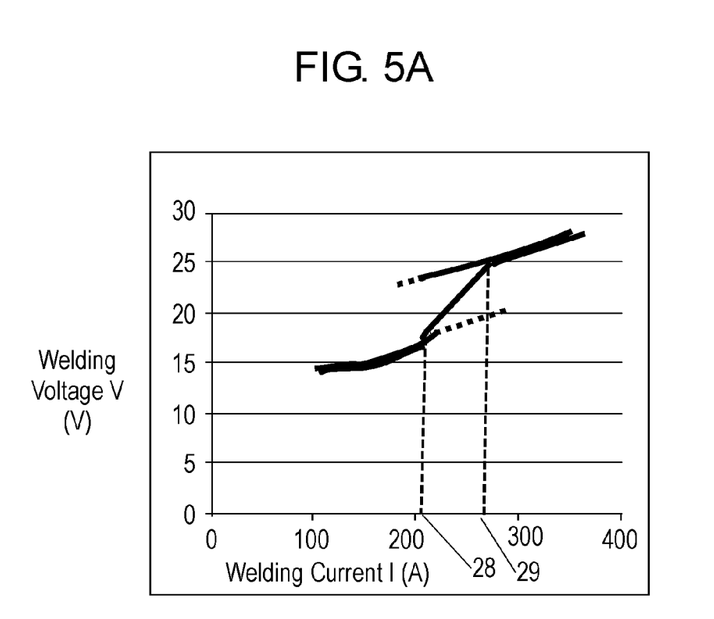
FIG. 5A illustrates a relationship between a welding current and a welding voltage in another arc welding method according to the embodiment.

FIG. 5A illustrates welding current I and welding voltage V in another arc welding method in accordance with the embodiment. In FIG. 5A, the vertical axis represents welding voltage V, and the horizontal axis represents welding current I.

Memory 15 (see FIG. 3) stores threshold value 28 and threshold value 29 more than threshold value 28. In a case where welding current I is equal to threshold value 28, or more than threshold value 28 and less than threshold value 29, or equal to threshold value 29, switch unit 17 selects the output of hybrid welding controller 12 to perform the hybrid welding alternately repeating the short-circuit welding and the pulse welding.

Figure 5B:
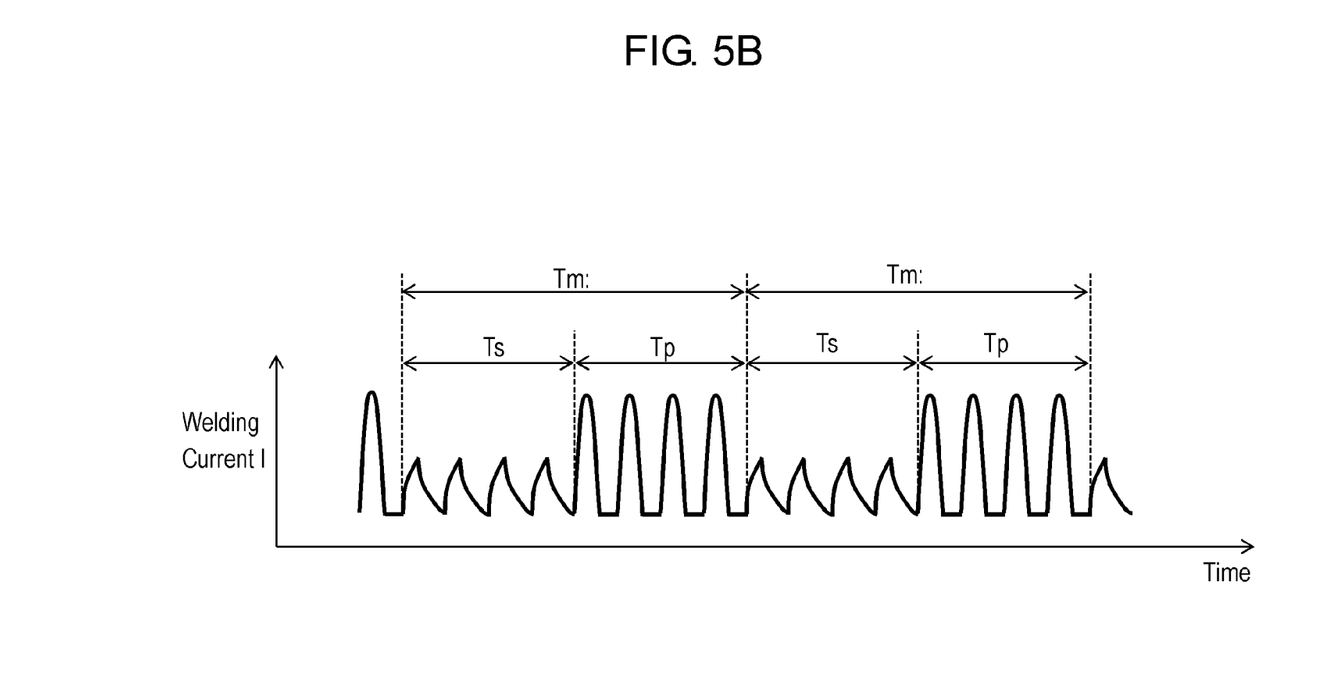
FIG. 5B illustrates a welding current in hybrid welding of the arc welding method illustrated in FIG. 5A.

FIG. 5B illustrates welding current I in the hybrid welding using the arc welding method illustrated in FIG. 5A. In FIG. 5B, the vertical axis represents welding current I, and the horizontal axis represents time. In the hybrid welding, controller 1001A alternately repeats the short-circuit welding and the pulse welding at switching period Tm. Controller 1001A controls switching block 3 so as to weld base material 22 by the short-circuit welding for duration Ts in switching period Tm. Controller 1001A controls switching block 3 so as to weld base material 22 by the pulse welding for duration Tp in switching period Tm. The sum of durations Ts and Tp is switching period Tm. As welding current I is increased from threshold value 28 to threshold value 29, the ratio of pulse welding duration Tp to switching period Tm is increased. As welding current I is gradually increased, proper welding voltage V can be gradually increased. This configuration suppresses a sudden change in heat input in a case where welding current I is changed, combines the short-circuit welding and the pulse welding smoothly, thereby stably welding base material 22 even if welding current I is changed.

FIG. 4 and FIG. 5A illustrate welding current I, welding voltage V, and threshold values 28 and 29 in a case where base material 22 is made of iron-based material.

In arc welding device 1001 in accordance with the embodiment, threshold values 28 and 29 are the values of welding current I. In accordance with the embodiment, threshold values 28 and 29 are welding parameters related to heat input to base material 22. The welding parameter is welding current I, welding voltage V, the wire feed speed of welding wire 19, or the thickness of base material 22. In other words, threshold values 28 and 29 are welding current I, welding voltage V, the wire feed speed of welding wire 19, or the thickness of base material 22. Controller 1001A compares the welding parameter with threshold values 28 and 29.

Figure 6:
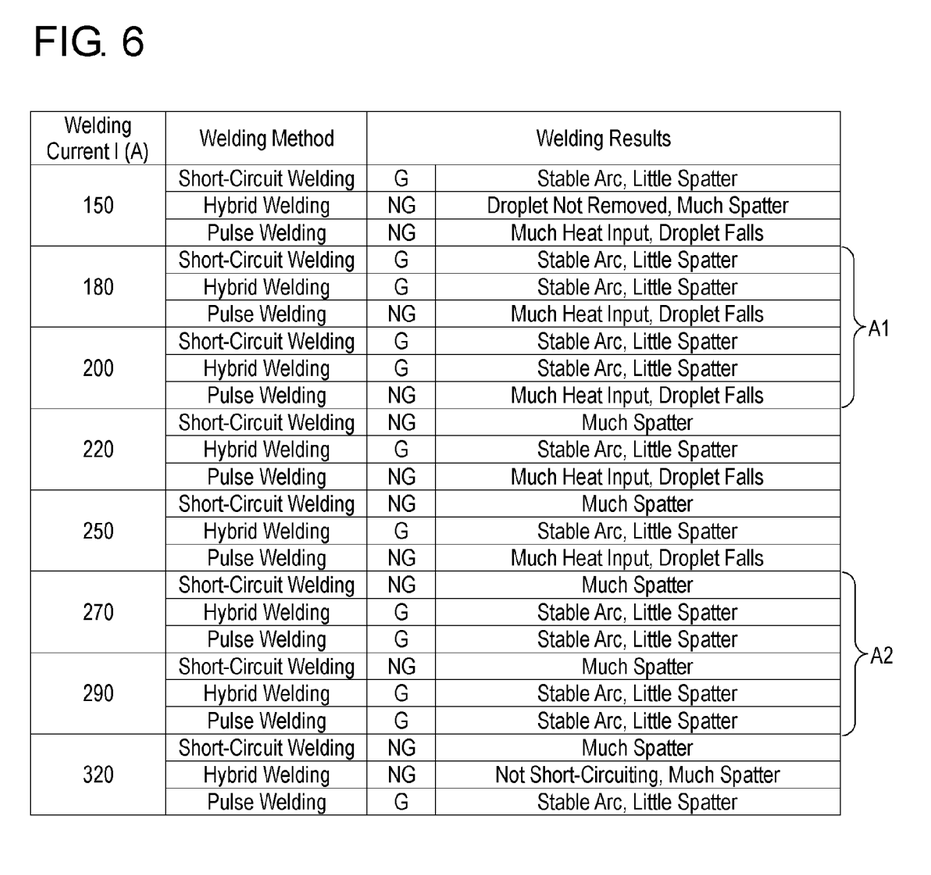
FIG. 6 is illustrates the welding current and welding results of the arc welding method according to the embodiment.

FIG. 6 illustrates the values of welding current I and the welding results of base material 22 at these values in a case where base material 22 is made of soft steel-based material which is iron-based metallic material. FIG. 6 illustrates the welding results in a case where the welding method is changed in response to values of welding current I. In FIG. 6, a letter, "G" represents a preferable welding result, and letters, "NG" represents a poor welding result. In the welding in FIG. 6, MAG welding (Metal active gas welding) is performed. Welding wire 19 is made of soft steel and has a diameter ϕ1.2. In a case where welding current I is used as a welding parameter, threshold value 28 is preferably equal to 180 A, or more than 180 A and less than 200 A, or equal to 200 A while threshold value 29 is preferably equal to 270 A, or more than 270 A and less than 290 A, or equal to 290 A as long as base material 22 is made of iron-based material, as illustrated in FIG. 6.

In order to explain threshold values 28 and 29 in a case where base material 22 is made of soft steel-based material with referring to FIG. 6, the welding result in a case where the welding method is changed to the short-circuit welding, the hybrid welding, and the pulse welding for values of welding current I will be described below.

Within a region of 150 A where welding current I is equal to 150 A, or more than 150 A and less than 180 A, base material 22 is welded by the short-circuit welding so that it is preferable that an arc is stable and little spatter occurs.

On the other hand, base material 22 is welded by the hybrid welding which alternately repeats the pulse welding and the short-circuit welding at a predetermined ratio, although the shape of bead formed by the short-circuit welding is preferable, since welding current I is low, a width of the bead formed by the short-circuit welding becomes narrower than a width of the bead formed by the pulse welding, and arc does not spread, the molten droplet is removed irregularly, and the spatter is increased when switching from the short-circuit welding to the pulse welding. Therefore, in a case where welding current I is equal to 150 A, or more than 150 A and less than 180 A, the short-circuit welding is more suitable than the hybrid welding.

When base material 22 is welded by the pulse welding, the heat input is increased, and molten droplet falls depending on a thickness of base material 22.

Within a region of 180 A where welding current I is equal to 180 A, or more 180 A and less than 200 A and a region of 200 A where welding current I is equal to 200 A, or more than 200 A and less than 220 A, that is, within region A1 where welding current I is equal to 180 A, or more than 180 A and less than 220 A, base material 22 is welded by the short-circuit welding so that it is preferable that an arc is stable and little spatter occurs.

Base material 22 welded by the hybrid welding provide a preferable shape of the bead formed by the short-circuit welding. Since welding current I is increasing, the width of the bead formed by the short-circuit welding in the hybrid welding is wide, which is substantially identical to the width of the bead formed by the pulse welding. Therefore, in the hybrid welding, molten droplets formed by the pulse welding regularly fall. When the short-circuit welding is switched to the pulse welding, little spatter occurs. Therefore, any of the short-circuit welding and the hybrid welding are preferable within the region 180 A and the region of 200 A of welding current I. If base material 22 is welded by the pulse welding instead of the hybrid welding within the region of 180 A and the region of 200 A, the heat input is increased and the molten droplet falling occurs depending on a thickness of base material 22.

In a case where base material 22 is made of soft steel-based material, threshold value 28 for selecting the welding method is thus preferably equal to 180 A, or more than 180 A and less than 220 A, or equal to or 220 A which is the region of 180 A and the region of 200 A. In a case where the short-circuit welding and the hybrid welding are performed on base material 22 in the region of threshold value 28, since the heat input becomes low by the short-circuit welding, during the welding, in a welded portion of base material 22, a meltdown which is a phenomenon that molten metal melts down from the base material to a side opposite to welding wire 19 can be reduced, the spatter can be decreased, and thus, base material 22 can be preferably welded.

Within a region of 220 A where welding current I is equal to 220 A, or more than 220 A and less than 250 A, the short-circuit welding is performed so that an arc is stable although much spatter occurs.

Since heat input is high in the pulse welding, the molten droplet may fall depending on a thickness of base material 22. In the hybrid welding alternately repeating the pulse welding and the short-circuit welding at a predetermined ratio, the arc spreads since the bead formed by the short-circuit welding spreads and the molten droplet of welding wire 19 regularly falls to the bead formed by the pulse welding with little spatter. Therefore, the hybrid welding is preferable within the region of 220 A. If base material 22 is welded by the pulse welding instead of the hybrid welding, the heat input is increased and the meltdown is generated depending on a thickness of base material 22.

Within a region of 250 A where welding current I is equal to 250 A, or more than 250 A and less than 270 A, base material 22 is welded by the short-circuit welding so that an arc is stable although much spatter occurs.

In addition, when base material 22 is welded by the pulse welding, since the heat input is high, meltdown in which molten metal melts down to a side opposite to welding wire 19 from the base material is generated in the welded portion of base material 22 during the welding depending on a thickness of base material 22. In the hybrid welding alternately repeating the pulse welding and the short-circuit welding at a predetermined ratio, since the width of the bead formed by the short-circuit welding is widened and exhibits a cooling effect, heat input to the base material is suppressed, and the width of the bead is widened, the arc is widened and the molten droplets of welding wire 19 regularly fall to the beads formed by the pulse welding with little spatter. Therefore, the hybrid welding is preferable within the region of 250 A. Within the region less than 250 A, the thickness of base material 22 is preferably less than, e.g. 3.2 mm. In addition, within the region of 200 A and the region of 180 A, the thickness of base material 22 is preferably equal to 1.6 mm, or more than 1.6 mm and less than 2.3 mm, or equal to 2.3 mm. Within a region less than 150 A, the thickness of base material 22 is preferably less than, e.g. 1.6 mm.

Within a region of 270 A where welding current I is equal to 270 A, or more than 270 A and less than 290 A and a region of 290 A where welding current I is equal to 290 A, or more than 290 A and less than 320 A, that is, within region A2 where welding current I is equal to 270 A, or more than 270 A and less than 320 A, since the thickness of base material 22 is equal to 3.2 mm, or more than 3.2 mm and less than 8 mm, even using the pulse welding, no meltdown occurs.

In addition, base material 22 is welded by the short-circuit welding so that an arc is stable although much spatter occurs. In the hybrid welding alternately repeating the pulse welding and the short-circuit welding at a predetermined ratio, since the width of the bead formed by the short-circuit welding is wide and exhibits the cooling effect, the meltdown is suppressed. Since the bead is widened, the arc is widened, and the molten droplets of welding wire 19 regularly fall to the bead which is formed by the pulse welding with little spatter. Base material 22 is welded by pulse welding instead of the hybrid welding preferably with little spatter and no meltdown. Therefore, any of the hybrid welding and the pulse welding are favorable within the region of 270 A and the region of 290 A.

Within the region of 320 A where welding current I is equal to 320 A, or more than 320 A and less than 400 A, since the thickness of base material 22 is equal to 8 mm, or more than 8 mm and less than 20 mm, the meltdown is not generated even in the pulse welding.

In addition, base material 22 is welded by the short-circuit welding so that an arc is stable although much spatter occurs. In the hybrid welding alternately repeating the pulse welding and the short-circuit welding at a predetermined ratio, since welding current I is high even in the short-circuit welding, the welding wire and the base material are not short-circuited, the molten droplets of the welding wire fall and are transferred to the base material, the droplets unstably fall with much spatter. On the other hand, if base material 22 is welded by the pulse welding instead of the hybrid welding, sufficient heat input is applied to thick base material 22 by the pulse welding, accordingly producing a deep penetration bead preferably with little spatter and no melting down. Therefore, the pulse welding is preferable within the region of 320 A. In addition, if the thickness of base material 22 is larger, the pulse welding can also be applied to a welding current exceeding the region of 320 A.

Accordingly, in a case where base material 22 is made of soft steel-based material, threshold value 29 for selecting the welding method is within a region where welding current I ranging from 270 A to 290 A, preferably equal to 270 A, or more than 270 A and less than 320 A. In a case where the short-circuit welding and the hybrid welding are performed with respect to the thickness of base material 22 with threshold value 29 equal to 320 A, or more than 320 A, deep penetration cannot be obtained due to low heat input to base material 22 with much spatter when the short-circuit welding is performed.

Figure 7:
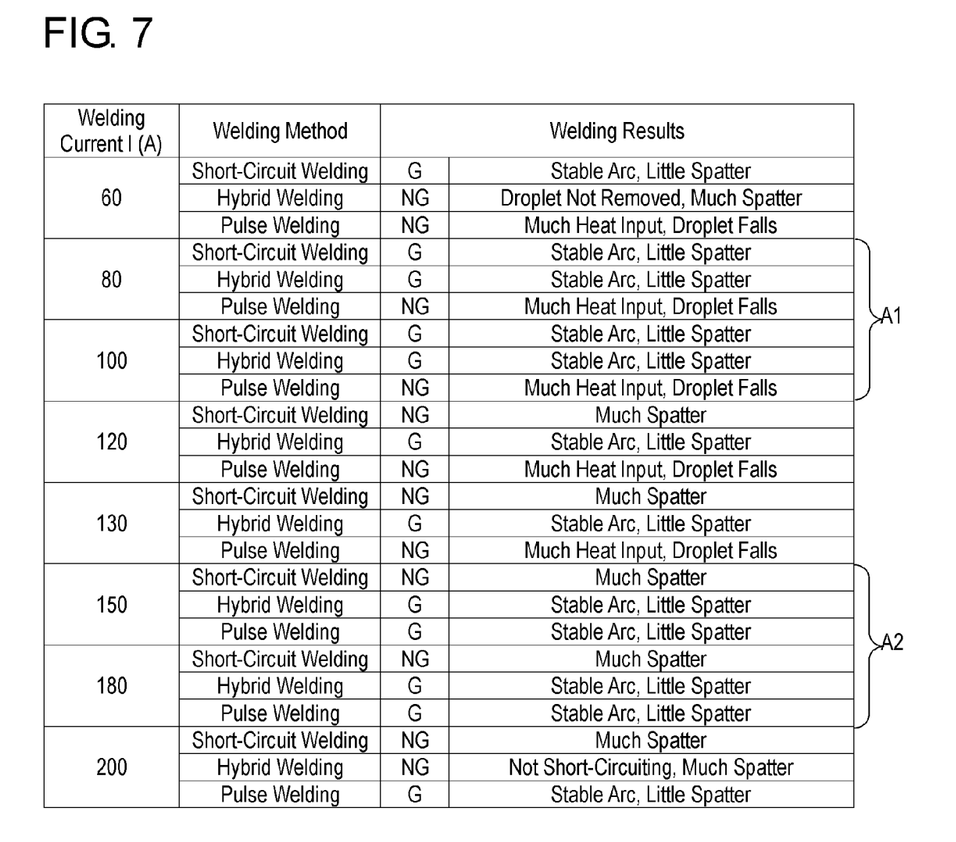
FIG. 7 illustrates the welding current and welding results of the arc welding method according to the embodiment.

FIG. 7 illustrates the values of welding current I and the welding results at these values in a case where base material 22 is made of aluminum-based material. FIG. 7 illustrates the welding results in a case where the welding method is changed for values of welding current I. In FIG. 7, a letter, "G" represents a preferable welding result, and letters, "NG" represents a poor welding result. In the welding of FIG. 7, MAG welding is performed. Welding wire 19 is made of hard aluminum and has a diameter of ϕ1.2. Base material 22 is made of hard aluminum.

In a case where base material 22 is made of aluminum-based material of nonferrous metal material, threshold value 28 is preferably equal to 80 A, or more than 80 A and less than 120 A. In addition, threshold value 29 is preferably equal to 150 A, or more than 150 A and less than 200 A.

In order to explain threshold values 28 and 29 with reference to FIG. 7 in a case where base material 22 is made of aluminum-based material, the welding results in a case where the welding method is changed to the short-circuit welding, the hybrid welding, and the pulse welding for values of welding current I will be described. In FIG. 7, the welding method is metal inert gas (MIG) welding.

Within a region of 60 A where welding current I is equal to 60 A, or more than 60 A and less than 80 A, the arc which welds base material 22 by the short-circuit welding is stable preferably with less spatter. When base material 22 is welded by the hybrid welding alternately repeating the pulse welding and the short-circuit at a predetermined ratio, although the shape of the bead formed by the short-circuit welding is preferable, since welding current I is low, the width of the bead formed by short-circuit welding is narrower than the width of the bead formed by pulse welding. Accordingly, when being switched from short-circuit welding to pulse welding in the hybrid welding, the arc is not widened and the molten droplets irregularly fall with much spatter. Therefore, the short-circuit welding is better suitable than the hybrid welding within the region of 60 A of the welding current. If base material 22 is welded by the pulse welding instead of the hybrid welding, the heat input is increased. Meltdown which is a phenomenon that the molten metal melts down to a side opposite to welding wire 19 from the base material may be generated in a welded portion of base material 22 during the welding depending on a thickness of base material 22. Within the region of 80 A where welding current I is equal to 80 A, or more than 80 A and less than 100 A and the region of 100 A where welding current I is equal to 100 A, or more than 100 A and less than 120 A, in other words, within region A1 where welding current I is equal to 80 A, or more than 80 A and less than 120 A, the arc when the short-circuit welding is performed is stable preferably with little spatter. When base material 22 is welded by the hybrid welding alternately repeating the pulse welding and the short-circuit welding at a predetermined ratio, the arc is wide since the width of the bead formed by the short-circuit welding is wide and the molten droplets formed by the pulse welding regularly fall with little spatter. Therefore, any of the short-circuit welding and the hybrid welding are preferable within the region of 80 A and the region of 100 A. If welding is performed by the pulse welding instead of the hybrid welding, heat input may be increased, and may generates melting down depending on a thickness of base material 22.

Accordingly, in a case where the base material is made of aluminum-based material, threshold value 28 for selecting the welding method is within a region where the welding current ranges from 80 A to 100 A, preferably equal to 80 A, or more than 80 A and less than 120 A. In a case where the short-circuit welding and the hybrid welding are performed on base material 22 within the region of threshold value 28, melting down of the welded portion of base material 22 due to low heat input during the short-circuit welding can be suppressed with preferably with little spatter.

In addition, within the region of 120 A where welding current I is equal to 120 A, or more than 120 A and less than 130 A and region 130 A where welding current I is equal to 130 A, or more than 130 A and less than 150 A, base material 22 is welded by the short-circuit welding so that an arc is stable although much spatter occurs.

When base material 22 is welded by the pulse welding, since heat input is high, melting down may be generated depending on the thickness of base material 22. In the hybrid welding alternately repeating the pulse welding and the short-circuit welding at a predetermined ratio, the arc is wide since the width of the bead formed by the short-circuit welding is wide and the molten droplets of welding wire 19 regularly fall with little spatter during the pulse welding. Therefore, the hybrid welding is preferable within the region of 120 A and the region of 130 A. Within the region less than 130 A, the thickness of base material 22 is preferably less than, e.g. 4 mm. In addition, within the region of 100 A and the region of 80 A, the thickness of base material 22 is preferably equal to e.g. 1.5 mm, or more than e.g. 1.5 mm and less than 3 mm, or equal to 3 mm. Within the region of the welding current less than 60 A, the thickness of base material 22 is preferably less than 1.5 mm.

If base material 22 is welded by the pulse welding instead of the hybrid welding, the heat input may be increased and meltdown may be generated according to base material 22.

Within the region of 150 A where welding current I is equal to 150 A, or more than 150 A and less than 180 A and within the region of 180 A where welding current I is equal to 180 A, or more than 180 A and less than 200 A, that is, within region A2 where welding current I is equal to 150 A, or more than 150 A and less than 200 A, since the thickness of base material 22 is large, i.e., equal to 4 mm, or more than 4 mm and less than 8 mm, no melting down is generated preferably at the welded portion of base material 22 even in the pulse welding.

In addition, base material 22 is welded by the short-circuit welding so that an arc is stable although much spatter occurs. In the hybrid welding alternately repeating the pulse welding and the short-circuit welding at a predetermined ratio, since the width of the bead formed by the short-circuit welding is wide and exhibits the cooling effect, the melting down of the welded portion of base material 22 is suppressed. Since the bead is wide, the arc is wide, molten droplets of welding wire 19 regularly fall with little less spatter during the pulse welding. Base material 22 is welded by the pulse welding, instead of the hybrid welding, preferably with little spatter and no melting down. Therefore, any of the hybrid welding and the pulse welding are preferable within the region of 150 A and the region of 180 A.

Within the region of 200 A where welding current I is equal to 200 A, or more than 200 A and less than 300 A, since the thickness of base material 22 is increased to, for example, a value equal to 8 mm, or more than 8 mm and less than 20 mm, no meltdown occurs in the welded portion of base material 22 even by the pulse welding.

In addition, when base material 22 is welded by the short-circuit welding so that an arc is stable although much spatter occurs. In the hybrid welding alternately repeating the pulse welding and the short-circuit welding at a predetermined ratio, since welding current I is high, the molten droplets fall even by the short-circuit welding, the molten droplets unstably fall with much spatter. Welding is performed by the pulse welding, instead of the hybrid welding, preferably with little spatter and no melting down of the welded portion of base material 22. Therefore, the pulse welding is preferable within the region of 200 A.

In addition, if the thickness of base material 22 is larger, the pulse welding can also be applied to a welding current exceeding the region of 200 A.

Accordingly, in a case where the base material is made of aluminum-based material, threshold value 29 for selecting the welding method is within the region of 150 A and the region of 180 A, preferably is equal to 150 A, or more than 150 A and less than 200 A. In a case where the short-circuit welding and the hybrid welding are performed on base material 22 when welding current I is equal to 200 A, or more than 200 A, deep penetration cannot be obtained due to low heat input in the short-circuit welding or much spatter is generated.

The above-described selection of the welding method using threshold value 28 and threshold value 29 more than threshold value 28 will be described below.

In a case where the welding parameter which is welding current I is equal to threshold value 28, or less than threshold value 28, the short-circuit welding can be selected as a first welding method.

In addition, in a case where the welding parameter is equal to threshold value 28, or less than threshold value 28, the short-circuit welding as a first welding method is selected. In a case where the welding parameter is within the range of threshold value 28, any of the short-circuit welding as the first welding method and the hybrid welding as a second welding method can be selected.

Alternatively, in a case where the welding parameter exceeds threshold value 28, the hybrid welding as the second welding method or the pulse welding as a third welding method is selected. In addition, in a case that the welding parameter is between threshold value 28 and threshold value 29, the short-circuit welding as the first welding method and the hybrid welding as the second welding method different from the pulse welding as the third welding method are selected. In a case where the welding parameter is within the region of threshold value 29, any of the hybrid welding as the second welding method and the pulse welding as the third welding method can be selected. If the welding parameter exceeds or is equal to threshold value 29, or more than threshold value 29, the pulse welding as the third welding method is selected.

In a case where base material 22 is made of soft steel-based material, threshold value 28 is equal to 180 A, or more than 180 A and less than 220 A. In a case where base material 22 is made of aluminum-based material, threshold value 28 is equal to 80 A, or more than 80 A and less than 120 A. In addition, in a case where base material 22 is made of soft steel-based material, threshold value 29 is equal to 270 A, or more than 270 A and less than 320 A. In a case where base material 22 is made of aluminum-based material, threshold value 29 is equal to 150 A, or more than 150 A and less than 200 A.

Threshold values 28 and 29 thus have ranges within which the threshold values can take. Any of plural welding methods can be selected within each of the ranges in which threshold values 28 and 29. Accordingly, it is possible to correspond to at least one of the welding methods around the threshold value.

Since welding wire 19 has different metal composition for each maker or brand and a short-circuit generation situation and the current value necessary for molten droplet withdrawal are different. In order to expand a tolerance corresponding to various welding wires 19, threshold value 28 and 29 have the ranges.

When the welding method is suddenly switched, the welding situation changes suddenly, and the welding becomes unstable (e.g. melting down of the welded portion of base material 22, and insufficient penetration), as described above. Therefore, the regions of threshold values 28 and 29 for selecting the welding method have an effect that, as the region using plural welding methods is increased, the change of the welding situation is gentle and thus the welding is stable.

In addition, for example, in a case where the thickness of base material 22 is used as a welding parameter and where base material 22 is made of soft steel-based material of iron-based metallic material, threshold value 28 is preferably within the range equal to 1.6 mm, or more than 1.6 mm and less than 2.3 mm, and threshold value 29 is preferably within the range equal to 3.2 mm, or more than 3.2 mm and less than 8 mm. In a case where base material 22 is made of aluminum-based material of nonferrous metal material, threshold value 28 is preferably within the range equal to 1.5 mm, or more than 1.5 mm and less than 3.0 mm, and threshold value 29 is preferably within the range equal to 4 mm, or more than 4 mm and less than 8 mm.

In the short-circuit welding and the short-circuit welding in the hybrid welding, a forward feeding of welding wire 19 fed toward base material 22 and a reverse feeding of welding wire 19 fed away from base material 22 may be performed alternately. In this case, in a case where the short-circuit welding or the hybrid welding is selected by threshold values 28 and 29 stored in memory 15, while the short-circuit welding is performed, switch unit 23 can perform mechanical short-circuit and open by feeding welding wire 19 using the reverse feeding and repeating the short-circuit and the open between base material 22 and welding wire 19, thereby reducing spatter.

Hybrid welding controller 12 increases a ratio of duration Tp of the pulse welding to switching period Tm which is the sum of short-circuit welding duration Ts and pulse welding duration Tp as the welding parameter which is welding current I, welding voltage V, or the feeding amount of welding wire 19 is increased.

In the arc welding method using arc welding device 1001 in accordance with the embodiment, particularly in a case of workers who do not understand welding operate, by adjusting the welding conditions even in base material 22 having portions with different thicknesses at many welding positions, the welding method corresponding to the welding parameter (welding current I, welding voltage V, the feed speed of welding wire 19, or the thickness of base material 22) related to heat input to base material 22 can be set. This configuration can suppress meltdown of the welding portion of base material 22 with less spatter, thus performing high-quality welding at high productivity.

Table 1 illustrates selectable welding methods in the relationship between welding parameter Pw and each of threshold values 28 and 29. The first welding method is the short-circuit welding, the second welding method is the hybrid welding alternately repeating the pulse welding and the short-circuit welding at a predetermined ratio, and the third welding method is the pulse welding.

TABLE 1

| Relationship between welding parameter Pw and each of threshold values 28 and 29 | Welding method |
| --- | --- |
| Pw < Threshold value 28 | Short-circuit welding |
| Pw = Threshold value 28 | One of short-circuit welding and hybrid welding |
| Threshold value 28 < Pw < Threshold value 29 | Hybrid welding |
| Pw = Threshold value 29 | One of hybrid welding and pulse welding |
| Pw > Threshold value 29 | Pulse welding |

As described above, in the welding method according to the embodiment, in a case where welding parameter Pw which is welding current I is less than threshold value 28, base material 22 is welded by the short-circuit welding as the first welding method. In a case where welding parameter Pw is equal to threshold value 28, base material 22 is welded by one of the short-circuit welding as the first welding method and the hybrid welding as the second welding method. In a case where welding parameter Pw is more than threshold value 28 and less than threshold value 29, base material 22 is welded by the hybrid welding as the second welding method. In a case where welding parameter Pw is equal to threshold value 29, base material 22 is welded by one of the hybrid welding as the second welding method and the pulse welding as the third welding method. In a case where welding parameter Pw is more than threshold value 29, base material 22 is welded by the pulse welding as the third welding method.

In a case where the welding parameter is within the region A1 of threshold value 28, any one of the short-circuit welding as the first welding method and the hybrid welding as the second welding method can be selected.

Alternatively, in a case where the welding parameter is more than threshold value 28, one of the hybrid welding as the second welding method and the pulse welding as the third welding method is selected. In a case where the welding parameter is between threshold values 28 and 29, the hybrid welding as the second welding method different from the short-circuit welding as the first welding method and the pulse welding as the third welding method are selected. In a case where the welding parameter is within region A2 of threshold value 29, any one of hybrid welding as the second welding method and the pulse welding as the third welding method can be selected.

As described above, in a case where the welding parameter related to the heat input to base material 22 is less than threshold value 28, base material 22 is welded by the first welding method. In a case where the welding parameter is equal to first threshold value 28, base material 22 is welded by one of the first welding method and the second welding method. In a case where the welding parameter is less than threshold value 29 and more than threshold value 28, base material 22 is welded by the second welding method. In a case where the welding parameter is equal to second threshold value 29, base material 22 is welded by one of the second welding method and the third welding method. In a case where the welding parameter is more than threshold value 29, base material 22 is welded by the third welding method.

Threshold value 28 can take a value within region A1. In a case where the welding parameter is within region A1, base material 22 can be welded by any one of the first welding method and the second welding method. Threshold value 29 can take a value within region A2. In a case where the welding parameter is within region A2, base material 22 can be welded by any one of the second welding method and the third welding method.

The first welding method may be the short-circuit welding while The third welding method may be the pulse welding.

The welding parameter is one of welding current I, welding voltage V, the feed speed of welding wire 19, and the thickness of base material 22.

The first welding method may be the short-circuit welding while the third welding method may be the pulse welding. In this case, the second welding method is the hybrid welding alternately repeating the short-circuit welding and the pulse welding at switching period Tm. In a case where the welding parameter is less than threshold value 29 and more than threshold value 28, a ratio between duration Ts in switching period Tm for which welding base material 22 is welded by the short-circuit welding and duration Tp in switching period Tm for which welding base material 22 is welded by the pulse welding may be changed according to welding current I or welding voltage V to weld base material 22.

In a case where the welding parameter is less than threshold value 29 and more than threshold value 28, the ratio of duration Tp during which base material 22 is welded by the pulse welding to switching period Tm may be increased as welding current I or welding voltage V is increased to weld base material 22.

In a case where the welding parameter is less than threshold value 28, base material 22 may be welded by the first welding method while alternately repeating the forward feeding of welding wire 19 toward base material 22 and the reverse feeding of welding wire 19 away from the base material. In a case where the welding parameter is less than threshold value 29 and more than threshold value 28, base material 22 may be welded by the second welding method while alternately repeating the forward feeding and the reverse feeding.

The welding parameter may be welding current I, and base material 22 may be made of soft steel-based material. In this case, threshold value 28 is equal to 180 A, or more than 180 A and less than 220 A, and threshold value 29 is equal to 270 A, or more than 270 A and less than 320 A.

The welding parameter may be welding current I, and base material 22 may be made of aluminum-based material. In this case, threshold value 28 is equal to 80 A, or more than 80 A and less than 120 A, and threshold value 29 is equal to 150 A, or more than 150 A and less than 200 A.

Arc welding device 1001 is configured to weld base material 22 with using welding wire 19. Arc welding device 1001 includes switching block 3 that controls welding current I and welding voltage V, current detector 9 that detects welding current I, voltage detector 8 that detects welding voltage V, feed motor 18 that feeds welding wire 19 at a feed speed, and controller 1001A which controls switching block 3. Controller 1001A is configured to control switching block 3 so as to weld base material 22 by the first welding method in a case where welding parameter which is welding current I or the feed speed is less than threshold value 28. Controller 1001A is configured to control switching block 3 so as to weld base material 22 by one of the first welding method and the second welding method in a case where the welding parameter is equal to threshold value 28. Controller 1001A is configured to control switching block 3 so as to weld base material 22 by the second welding method in a case where the welding parameter is less than threshold value 29 and more than threshold value 28. Controller 1001A is configured to control switching block 3 so as to weld base material 22 by one of the second welding method and the third welding method in a case where the welding parameter is equal to threshold value 29. Controller 1001A is configured to control switching block 3 so as to weld base material 22 by the third welding method in a case where the welding parameter is more than threshold value 29.

REFERENCE MARKS IN THE DRAWINGS 1 input power supply
2 primary rectifier
3 switching block
4 main transformer
5 secondary rectifier
6 reactor
7 driver
8 voltage detector
9 current detector
10 pulse waveform controller
11 short-circuit welding controller
12 hybrid welding controller
14 welding condition setting unit
15 memory
16 wire feed speed controller
17 switch unit
18 feed motor
19 welding wire
20 chip
21 arc
22 base material
23 switch unit
28 threshold value (first threshold value)
29 threshold value (second threshold value)
1001 arc welding device
1001A controller
Tm switching period

The invention claimed is:

1. An arc welding method comprising:
welding a base material by a short-circuit welding, a pulse welding, and a hybrid welding which alternately repeats the short-circuit welding and the pulse welding at a switching period,
wherein the switching period is the sum of a period in which the base material is welded by the short-circuit welding and a period in which the base material is welded by the pulse welding in the switching period, and in the hybrid welding, welding the base material by increasing a ratio of the period during which the base material is welded by the pulse welding to the switching period as a welding current or a welding voltage increases.

2. The arc welding method of claim 1, wherein a welding parameter related to heat input to the base material is one of a welding current, a welding voltage, a wire feed speed of a welding wire, and a thickness of the base material.

3. The arc welding method of claim 1, further comprising:
welding the base material by the short-circuit welding in case where a welding parameter related to heat input to the base material is equal to or less than a first threshold value,
welding the base material by the hybrid welding in a case where the welding parameter is less than a second threshold value and is more than the first threshold value, or
welding the base material by the pulse welding in case where the welding parameter is equal to or more than the second threshold value,
wherein the welding parameter is a welding current,
wherein the base material is made of a soft steel-based material,
wherein the first threshold value is equal to 180 A, or more than 180 A and less than 220 A, and
wherein the second threshold value is equal to 270 A, or more than 270 A and less than 320 A.

4. The arc welding method of claim 1, further comprising:
welding the base material by the short-circuit welding in case where a welding parameter related to heat input to the base material is equal to or less than a first threshold value,
welding the base material by the hybrid welding in a case where the welding parameter is less than a second threshold value and is more than a first threshold value, or
welding the base material by the pulse welding in case where the welding parameter is equal to or more than the second threshold value,
wherein the welding parameter is a welding current,
wherein the base material is made of aluminum-based material,
wherein the first threshold value is equal to 80 A, or more than 80 A and less than 120 A, and
wherein the second threshold value is equal to 150 A, or more than 150 A and less than 200 A.

5. An arc welding device configured to weld a base material using a welding wire, the arc welding device comprising:
a switching block that controls a welding current and a welding voltage;
a current detector that detects the welding current;
a voltage detector that detects the welding voltage;
a feed motor that feeds the welding wire at a feed speed; and
a controller that controls the switching block,
wherein the controller is configured to control the switching block so as to:
weld the base material by a short-circuit welding, by a pulse welding, and by a hybrid welding which alternately repeats a short-circuit welding and a pulse welding at a switching period, and
wherein the controller is configured to control the switching block, so as to weld the base material by the hybrid welding by increasing a ratio between a duration in the switching period for which the base material is welded by the short-circuit welding and a duration in the switching period for which the base material is welded by the pulse welding, as the welding current or the welding voltage increases.

6. The arc welding device of claim 5,
wherein the controller is configured to control the switching block so as to:
weld the base material by a first welding method which is a short-circuit welding while alternately repeating a forward feeding of feeding the welding wire toward the base material and a reverse feeding of feeding the welding wire away from the base material, in the case where a welding parameter related to heat input to the base material is less than a first threshold value, and
weld the base material by a second welding method which is the hybrid welding while alternately repeating the forward feeding and the reverse feeding, in the case where the welding parameter related to heat input to the base material is less than a second threshold value and is more than the first threshold value.

7. The arc welding device of claim 5, wherein the controller is configured to control the switching block, so as to weld the base material by the hybrid welding by increasing a ratio of the duration for which the base material is welded by the pulse welding to the switching period as the welding current or the welding voltage is increased, in the case where the welding parameter related to heat input to the base material is less than the second threshold value and is more than the first threshold value.

8. The arc welding device of claim 6, wherein the controller is configured to control the switching block, so as to weld the base material by the hybrid welding by increasing a ratio of the duration for which the base material is welded by the pulse welding to the switching period as the welding current or the welding voltage is increased, in the case where the welding parameter related to heat input to the base material is less than the second threshold value and is more than the first threshold value.

* * * * *